US012427682B2

(12) United States Patent
Tittle

(10) Patent No.: US 12,427,682 B2
(45) Date of Patent: Sep. 30, 2025

(54) HAIR DETECTION IN A HAIR-CUTTING SYSTEM

(71) Applicant: KONINKLIJKE PHILIPS N.V., Eindhoven (NL)

(72) Inventor: Collin Matthew Tittle, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 192 days.

(21) Appl. No.: 18/282,819

(22) PCT Filed: Feb. 25, 2022

(86) PCT No.: PCT/EP2022/054813
§ 371 (c)(1),
(2) Date: Sep. 19, 2023

(87) PCT Pub. No.: WO2022/199982
PCT Pub. Date: Sep. 29, 2022

(65) Prior Publication Data
US 2024/0173880 A1 May 30, 2024

(30) Foreign Application Priority Data
Mar. 26, 2021 (EP) .................................... 21165334

(51) Int. Cl.
*B26B 19/38* (2006.01)
*B26B 19/06* (2006.01)

(52) U.S. Cl.
CPC ........ *B26B 19/388* (2013.01); *B26B 19/3846* (2013.01); *B26B 19/06* (2013.01)

(58) Field of Classification Search
CPC .... B26B 19/388; B26B 19/3846; B26B 19/06
See application file for complete search history.

(56) References Cited

U.S. PATENT DOCUMENTS 5,604,986 A * 2/1997 Masuda ................ B26B 19/382 30/233
5,687,481 A * 11/1997 De Boer ............... B26B 19/388 30/43.6
5,983,502 A 11/1999 Geertsma et al.
(Continued)

OTHER PUBLICATIONS

International Search report and Written Opinion of PCT/EP2022/054813, dated May 19, 2022.

*Primary Examiner* — Omar Flores Sanchez

(57) ABSTRACT

In a hair-cutting system (1) that comprises a cutter arrangement (20) configured to be moved over skin (10) and comprising at least one functional cutter unit (21) configured to perform a cutting action on hairs (11) protruding from the skin (10), a hair detector (30) is used for the purpose of detecting the presence of a hair (11) in a detection area (31) near or in the at least one functional cutter unit (21). The hair detector (30) comprises at least one hair-contacting portion (32) made from a mechanically deformable material and is configured to provide detector output ($d_{out}$) representative of whether or not a hair (11) is detected in the detection area (31). In this way, a method of controlling operation of the hair-cutting system (1) in relation to hair detection is enabled.

15 Claims, 5 Drawing Sheets

(56) References Cited

U.S. PATENT DOCUMENTS

| | | | |
|---|---|---|---|
| 6,825,445 | B2 | 11/2004 | Shalev et al. |
| 9,849,598 | B2 | 12/2017 | Damkat et al. |
| 10,736,396 | B2 | 8/2020 | Kindermann |
| 2007/0209211 | A1* | 9/2007 | Pragt ....................... B26B 19/06 30/223 |
| 2009/0221993 | A1 | 9/2009 | Sohi et al. |
| 2011/0167639 | A1* | 7/2011 | Lau ......................... B26B 19/28 30/45 |
| 2014/0137714 | A1 | 5/2014 | Krenik |
| 2018/0319026 | A1* | 11/2018 | Hayashi ................ B26B 19/046 |
| 2018/0370050 | A1 | 12/2018 | Janssen |
| 2019/0126500 | A1 | 5/2019 | Wu |
| 2021/0308884 | A1* | 10/2021 | Grasmeijer ........... B26B 19/143 |
| 2023/0035264 | A1* | 2/2023 | Polygerinos ........ B26B 19/3846 |
| 2024/0083050 | A1* | 3/2024 | Antonakis ............. B26B 21/405 |

* cited by examiner

HAIR DETECTION IN A HAIR-CUTTING SYSTEM

CROSS-REFERENCE TO PRIOR APPLICATIONS

This application is the U.S. National Phase application under 35 U.S.C. § 371 of International Application No. PCT/EP2022/054813, filed on Feb. 25, 2022, which claims the benefit of European Patent Application No. 21165334.0, filed on Mar. 26, 2021. These applications are hereby incorporated by reference herein.

FIELD OF THE INVENTION

The invention relates to a hair-cutting system comprising a cutter arrangement configured to be moved over skin and comprising at least one functional cutter unit configured to perform a cutting action on hairs protruding from the skin.

Further, the invention relates to a hair-cutting appliance comprising a functional head supported on a body, wherein a hair-cutting system as described here before is incorporated in the hair-cutting appliance, and wherein the cutter arrangement of the hair-cutting system is located in the functional head of the hair-cutting appliance.

BACKGROUND OF THE INVENTION

Hair-cutting appliances, particularly electric hair-cutting appliances, are generally known and include trimmers, clippers and shavers, for example. Electric hair-cutting appliances are powered by electric supply mains and/or by electric energy storage devices such as batteries. Electric hair-cutting appliances are generally used to shave or trim (human) body hair so that a person can have a well-groomed appearance.

In practical cases, a hair-cutting system that is suitable to be part of an electric hair-cutting appliance comprises a cutter arrangement that is suitable to be moved over the skin by a user and that comprises at least one functional cutter unit configured to perform a cutting action on hairs protruding from the skin. Traditionally, the at least one functional cutter unit comprises a combination of a movable component and a stationary component, wherein at least the movable component includes a cutting blade. In such a case, use of the hair-cutting system involves putting the hair-cutting system to an operation mode in which the movable component of the at least one functional cutter unit is actually moved, and moving the cutter arrangement over the skin. In the process, hairs protruding from the skin are caught in a space of the at least one functional cutter unit in which they are made to abut against the stationary component and are cut through when they are encountered by the movable component. An example of an alternative possibility is a possibility according to which a hair-cutting system comprises at least one functional cutter unit that is configured to make use of laser light for cutting off hairs. In such a case, it is practical if the hair-cutting system is equipped with a laser source and an optical fiber that extends from the laser source to the at least one functional cutter unit so that laser light can be emitted at the position of the at least one functional cutter unit and can cut through hairs when the hair-cutting system is operated and used on skin.

In order to obtain good hair-cutting results, it is intended to cut the hairs at a position that is as close as possible to the skin. A downside of this general aspect of hair-cutting is that skin irritation may occur. This problem is acknowledged in the art and various ways of reducing skin irritation without giving up too much on closeness of the hair-cutting have been developed until now. It is an object of the invention to provide measures which can be useful to reduce skin irritation and/or to achieve one or more other beneficial effects on the basis of a different approach than the approaches that have yielded the conventional solutions.

SUMMARY OF THE INVENTION

In view of the foregoing, the invention provides a hair-cutting system comprising:

- a cutter arrangement configured to be moved over skin and comprising at least one functional cutter unit configured to perform a cutting action on hairs protruding from the skin; and
- a hair detector configured and arranged to detect the presence of a hair in a detection area near or in the at least one functional cutter unit, wherein the hair detector;
- is arranged to come into mechanical contact with a hair when the cutter arrangement is moved over the skin;
- comprises at least one hair-contacting portion made from a mechanically deformable material;
- comprises a measuring system configured to measure a degree of mechanical deformation of the hair-contacting portion; and
- comprises a detector output unit configured to determine the presence of a hair in contact with the hair-contacting portion based on the measured degree of the mechanical deformation of the hair-contacting portion, and to generate a detector output representative of whether or not a hair is detected in the detection area:

wherein the hair-cutting system further comprises:

- a processor configured to receive the detector output from the detector output unit and to determine at least one operation parameter of the hair-cutting system in dependence on the detector output.

As explained in the foregoing, hair-cutting technologies are challenged by the need to balance hair-cutting closeness with skin comfort. In the context of the invention, it is acknowledged that the known hair-cutting systems can be characterized as systems which indiscriminately cut whatever appears at the position of the at least one functional cutter unit. Thus, both hairs and skin are cut in a probabilistic process in the conventional situation. The invention provides measures on the basis of which it is possible to implement a sophisticated way of operating a hair-cutting system which allows for only actuating the at least one functional cutter unit when there is actually a hair that can be subjected to a cutting action, to thereby realize a higher probability of cutting hair and a lower chance of cutting skin during use of the hair-cutting system.

The fact is that the hair-cutting system according to the invention comprises a hair detector that is configured and arranged to detect the presence of a hair in a detection area near or in the at least one functional cutter unit. The hair detector is arranged to come into mechanical contact with a hair when the cutter arrangement is moved over the skin and comprises at least one hair-contacting portion made from a mechanically deformable material to that end. As defined in the foregoing, the hair detector further comprises a measuring system configured to measure a degree of mechanical deformation of the hair-contacting portion, and also a detector output unit configured to determine the presence of a hair in contact with the hair-contacting portion based on the measured degree of the mechanical deformation of the hair-contacting portion, and to generate a detector output representative of whether or not a hair is detected in the detection area. The degree of mechanical deformation of the hair-contacting portion may be a degree of mechanical compression of the hair-contacting portion, for example, Other examples of the mechanical deformation are elongation and torsion. The detector output can be used for controlling operation of the hair-cutting system in relation to hair detection. In this respect, it is noted that the hair-cutting system according to the invention further comprises a processor configured to receive the detector output from the detector output unit and to determine at least one operation parameter of the hair-cutting system in dependence on the detector output.

It is an insight of the invention that the stiffness of hairs is much higher than the stiffness of skin tissue, and that as a result, when the cutter arrangement is moved over the skin, hairs will press against the hair-contacting portion of the hair detector with a much higher force than small skin folds. Thus, it is very well possible to define force-related criteria which can be used for distinguishing a situation in which a hair is encountered from other situations, and the hair detector can function with high accuracy and reliability. For the sake of completeness, it is noted that the Young's modulus is commonly used as a measure of stiffness.

In conformity with that has been suggested in the foregoing, the at least one operation parameter of the hair-cutting system that is determined in dependence on the detector output may be a parameter that is functional in setting an actuation status of the at least one functional cutter unit. According to one possibility covered by the invention, the cutter arrangement comprises at least one movable component, and the processor is configured to determine a control parameter for movement of the movable component in dependence on the detector output. In such a case, the at least one operation parameter comprises the control parameter for movement of the movable component, wherein the control parameter may be set either at a value of causing the movable component to move or at a value of keeping the movable component stationary. According to another possibility covered by the invention, the functional cutter unit comprises at least one laser emitter, and the processor is configured to determine an on/off status of the at least one laser emitter in dependence on the detector output. In the present context, the on status of the at least one laser emitter is to be understood so as to be a functional status in which laser light is emitted with an intensity that is sufficient to enable the laser light to bring about the intended cutting process of a hair, and the off status of the at least one laser emitter is to be understood so as to be a non-functional status in which laser light is emitted at a significantly lower intensity or in which no laser light is emitted at all.

According to another or an additional option, the at least one operation parameter of the hair-cutting system that is determined in dependence on the detector output may be a parameter that is functional in setting an actuation status of the hair-cutting system. In particular, the actuation status of the hair-cutting system may be either a standby status and an actuated status. The processor may be configured such that when the hair-cutting system is in the standby status and detector output indicating that a hair is detected in the detection area is received, the hair-cutting system is put to the actuated status. When this option is put to practice, the hair-cutting system can be designed without an on/off button or the like, as the hair-cutting system is automatically put from the standby status to the actuated status when the user initiates an action of moving the cutter arrangement over skin, and the processor may further be configured to automatically put the hair-cutting system from the actuated status to the standby status on the basis of an appropriate criterion such as time passed since a last hair detection event.

In a practical embodiment of the hair-cutting system according to the invention, the hair-contacting portion of the hair detector is made from a mechanically deformable and electrically conductive material, wherein the measuring system comprises an electric circuit configured to measure a change of the electric resistance or electric conductivity of the hair-contacting portion resulting from mechanical deformation of the hair-contacting portion, and wherein the detector output unit is configured to determine the presence of a hair in contact with the hair-contacting portion based on the measured change of the electric resistance or electric conductivity of the hair-contacting portion. In this respect, it is noted that it is useful if the hair-contacting portion is made from an electrically conductive, mechanically deformable conformal polymer.

Assuming that the at least one functional cutter unit has a hair-cutting area in which the functional cutter unit is configured to cut the hair, the concept of controlling operation of the hair-cutting system in relation to hair detection is realized in an optimal way if the detection area corresponds with the hair-cutting area.

In order to allow contact of a hair to the hair-contacting portion of the hair detector to bring about a considerable mechanical effect in the hair-contacting portion and to thereby realize sufficient detection sensitivity of the hair detector, it is practical if the hair-contacting portion comprises an elongate strip having a thickness and width which are small relative to a length of the strip, and if the strip is arranged to be mechanically deformed by the hair in its thickness direction. In case the measuring system comprises an electric circuit as mentioned here before, it may be so that both end portions of the elongate strip are integrally formed with an electric contact pad for electric connection of the strip to the electric circuit. When a hair enters the detection area, it will be pressed against the elongate strip and the elongate strip will be deformed. The deformation of the elongate strip will result in an increase of the electrical resistance of the elongate strip, which can be measured by the electric circuit.

In the context of the invention, the hair-cutting system may comprise any suitable number of functional cutter units. Thus, the number may be one, but it is also possible that the cutter arrangement comprises a plurality of functional cutter units. If the latter is the case, a sophisticated embodiment of the hair-cutting system is obtained if each of the functional cutter units is configured for actuation independently of the other functional cutter units. That does not alter the fact that the invention also covers the option of the functional cutter units being jointly actuable. In any case, if the hair-cutting system comprises more than one functional cutter unit, it is advantageous if the presence of a hair can be detected in each one of the functional cutter units, which means that it is advantageous if the hair detector comprises, for each respective one of the functional cutter units, a hair-contacting portion configured and arranged to detect the presence of a hair in the detection area near or in said respective one of the functional cutter units.

In the case that the cutter arrangement comprises at least one movable component, it may particularly be so that the functional cutter unit of the cutter arrangement comprises a pair of stationary hair-cutting teeth and at least one movable hair-cutting member, wherein a hair-catching space is present between the teeth of the pair of stationary hair-cutting teeth, and wherein the hair-contacting portion of the hair detector is arranged in the hair-catching space. In this respect, it is noted that an advantageous location of the hair-contacting portion is a narrowest location of the hair-catching space where base portions of the two teeth of the pair of stationary hair-cutting teeth are connected to each other, as this is the location where hairs which are caught in the hair-catching space are expected to end up. Further, only very narrow skin folds can also press against the hair-contacting portion at the narrowest location, but, as explained earlier, this is with a force that is low compared to the pressing force of a hair. Thus, the detector output unit can distinguish between the presence of a hair or skin in the hair-catching space between the stationary hair-cutting teeth.

It may be practical to have a hair-cutting system in which the cutter arrangement comprises more than one functional cutter unit having a pair of stationary hair-cutting teeth in which a hair-catching space is present, so that use can be made of a plurality of functional cutter units each having a pair of stationary hair-cutting teeth in which a hair-catching space is present. It is advantageous if in such a hair-cutting system, the hair detector comprises a plurality of hair-contacting portions which are each arranged in a respective one of the hair-catching spaces of the plurality of functional cutter units. This is in conformity with the earlier remark that if the hair-cutting system comprises more than one functional cutter unit, it is advantageous if the presence of a hair can be detected in each one of the functional cutter units.

It follows from the foregoing that by putting the invention to practice, it is achieved that the presence of hair versus skin can be detected, and that information about whether or not a hair is present can be used to advantage, such as for the purpose of realizing targeted hair removal by targeted actuation of functional hair-cutting components, wherein it may be so that the hair-cutting components are not simply continuously operated but only when necessary. i.e. when there is actually a hair to act upon. The above-described and other aspects of the invention will be apparent from and elucidated with reference to the following detailed description of a practical embodiment of an electric hair-cutting appliance, particularly of a hair-cutting system that is part of the hair-cutting appliance.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
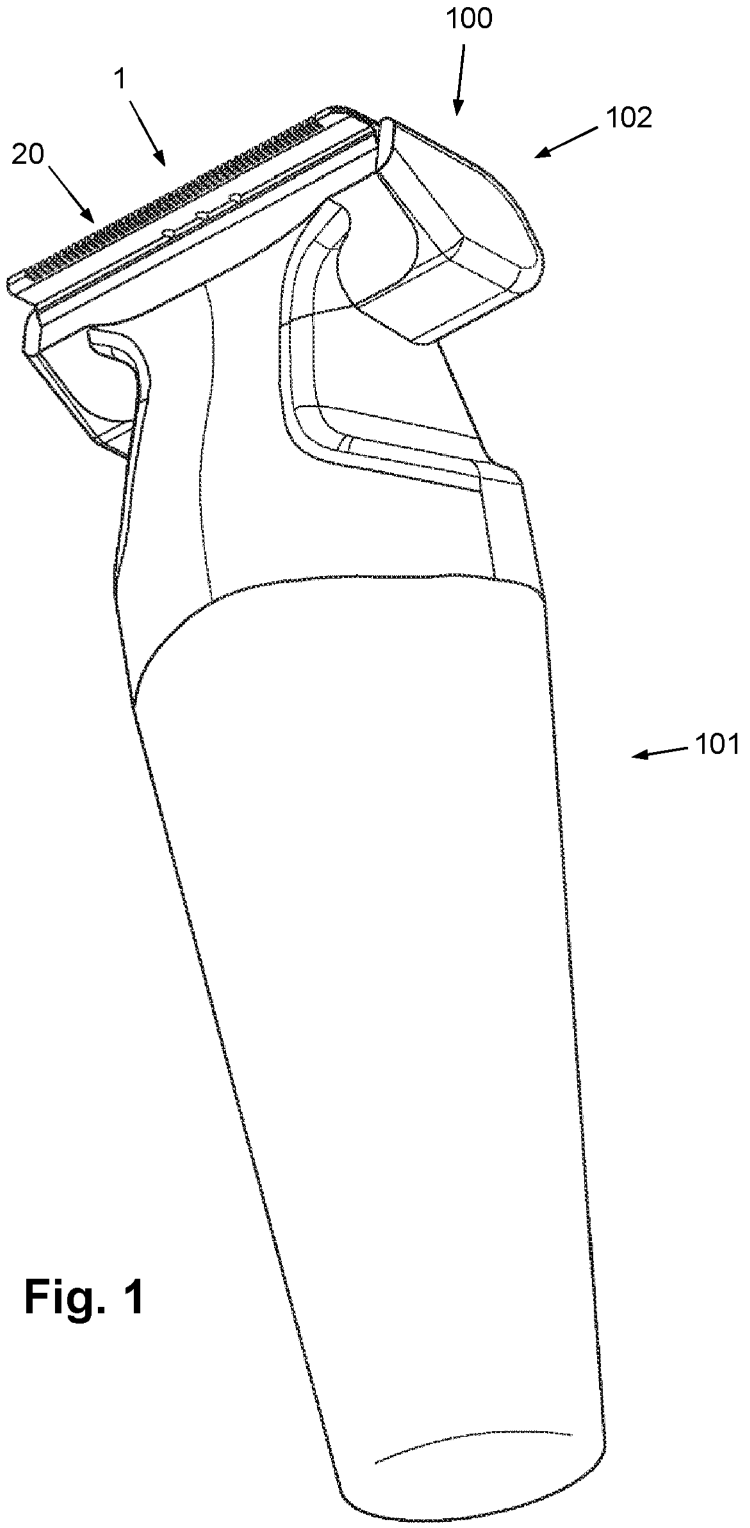
FIG. 1 diagrammatically shows a perspective view of an electric hair-cutting appliance according to an embodiment of the invention, which hair-cutting appliance is equipped with a hair-cutting system that comprises a cutter arrangement and a hair detector, FIG. 2 diagrammatically shows a basic set-up of a hair-cutting system according to a first embodiment of the invention, and illustrates how the hair-cutting system can be used on skin to cut hairs protruding from the skin, FIG. 3 diagrammatically shows a comb-shaped guard element that is included in the cutter arrangement, FIG. 4 diagrammatically shows a comb-shaped cutter element that is included in the cutter arrangement, FIG. 5 diagrammatically shows a hair-contacting portion of the hair detector.

FIG. 1 shows an electric hair-cutting appliance 100 according to an embodiment of the invention. The hair-cutting appliance 100 as shown is of the type that is suitable to be used for beard trimming, for example, Generally speaking, the hair-cutting appliance 100 comprises a body 101 and a functional head 102, wherein the body 101 is designed to enable a user of the hair-cutting appliance 100 to take hold of the hair-cutting appliance 100 and to handle the hair-cutting appliance 100, and wherein the functional head 102 is the part of the hair-cutting appliance 100 that is to be positioned on and moved over skin for hair removal.

Figure 2:
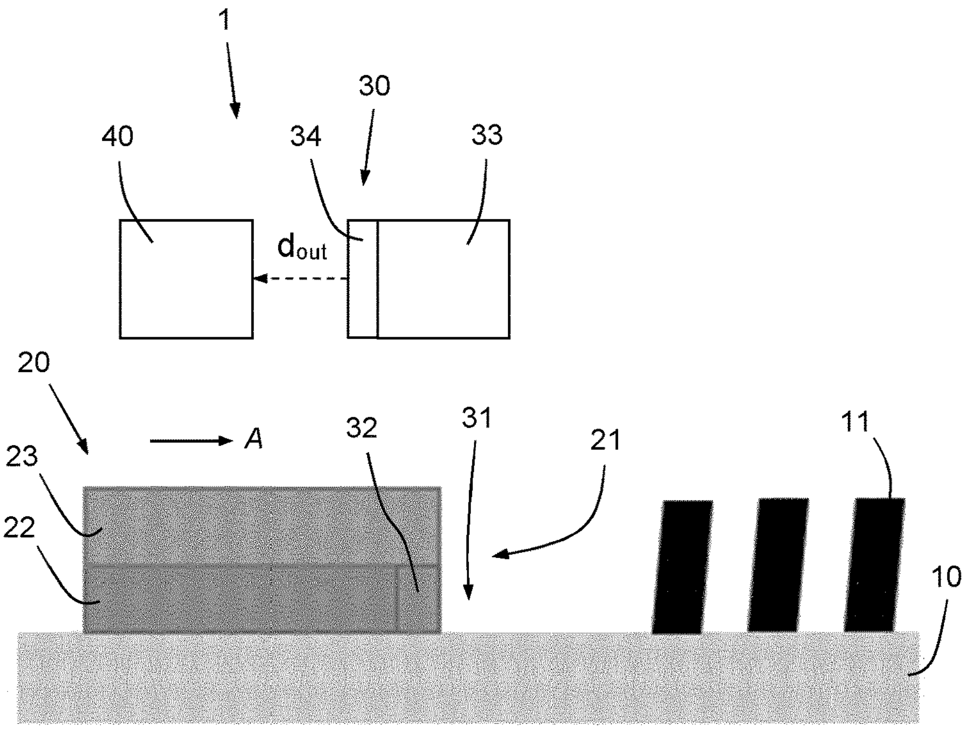

With reference to FIG. 2, it is noted that the hair-cutting appliance 100 is equipped with a hair-cutting system 1 according to the invention, which hair-cutting system 1 comprises a cutter arrangement 20 and a hair detector 30. The cutter arrangement 20 is configured to be moved over the skin 10 and therefore is located in the functional head 102 of the hair-cutting appliance 1. Further, a general feature of the cutter arrangement 20 is that the cutter arrangement 20 comprises at least one functional cutter unit 21 configured to perform a cutting action on hairs 11 protruding from the skin 10. The hair detector 30 serves to detect the presence of a hair 11 in a detection area 31 near or in the at least one functional cutter unit 21, and the hair-cutting system 1 further comprises a processor 40 that is configured to receive information about whether or not a hair is present from the hair detector 30 and to use this information for the purpose of determining at least one operation parameter of the hair-cutting system 1. Details of the hair detector 30 and the processor 40 will be explained later.

Figure 3:
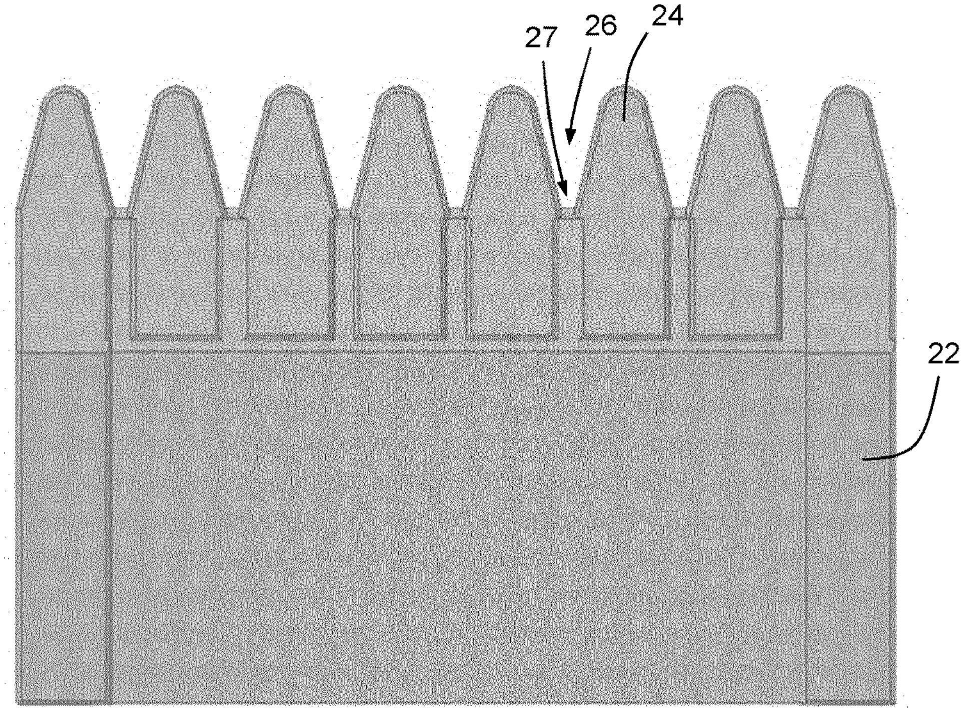
Figure 4:
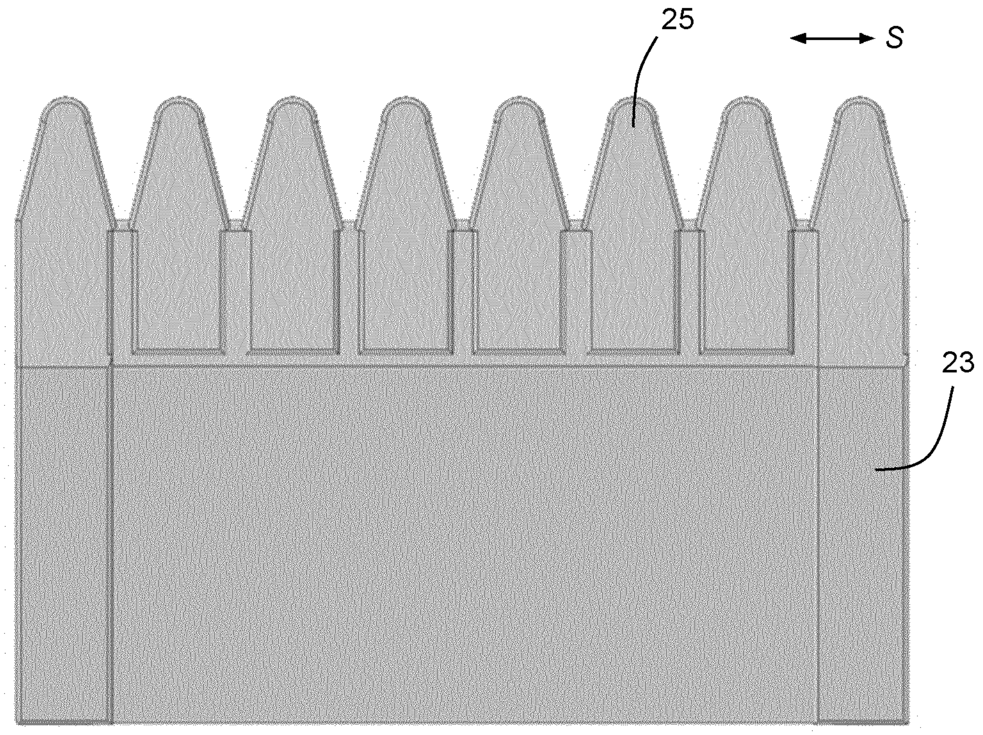

In the context of the invention, the cutter arrangement 20 may be of any appropriate design and may comprise an appropriate number of functional cutter units 21. FIGS. 3 and 4 illustrate an option according to which the cutter arrangement 20 comprises a combination of two comb-shaped elements 22, 23. One of the comb-shaped elements 22, 23 is a guard element 22 that is fixedly arranged in the functional head 102 of the hair-cutting appliance 100 and the other of the comb-shaped elements 22, 23 is a cutter element 23 that is movably arranged in the hair-cutting appliance 100. The guard element 22 is shown separately in FIG. 3, and the cutter element 23 is shown separately in FIG. 4. It can be seen that in the shown example, the guard element 22 and the cutter element 23 are of comparable design.

The guard element 22 comprises a row of hair-cutting teeth 24. Likewise, the cutter element 23 comprises a row of hair-cutting teeth 25. In the cutter arrangement 20, the guard element 22 and the cutter element 23 are arranged on top of each other, in such a way that the rows of hair-cutting teeth 24, 25 of the elements 22, 23 overlap, with the guard element 22 at the side of the cutter arrangement 20 that is to face the skin 10. The cutter element 23 is movable in a sideward direction S being the direction in which the rows of hair-cutting teeth 24, 25 of the guard element 22 and the cutter element 23 extend. During operation, the cutter element 23 is driven so as to perform a reciprocating movement in the sideward direction S. When the cutter arrangement 20 is moved over the skin 10 in an advancing direction A, hairs 11 are caught in hair-catching spaces 26 as present between two adjacent hair-cutting teeth 24 of the guard element 22, and the caught hairs 11 are cut off by means of the moving cutter element 23 when the hairs 11 are encountered by the hair-cutting teeth 25 of the moving cutter element 23. In the shown example, the hair-cutting teeth 24 of the guard element 22 have a tapered shape in the advancing direction A so that the hair-catching spaces 26 converge in the opposite direction and are the most narrow at the position of base portions of the hair-cutting teeth 24. The converging shape of the hair-catching spaces 26 contributes to effectiveness of the hair-catching functionality of the guard element 22.

Each of a pair of adjacent hair-cutting teeth 24 of the guard element 22, in combination with the cutter element 23, makes up a functional cutter unit 21 of the cutter arrangement 20. In the shown example, the guard element 22 comprises eight hair-cutting teeth 24, so that the cutter arrangement 20 comprises seven functional cutter units 21. It will be understood that the number of seven in respect of the functional cutter units 21 is just one out of many feasible practical options.

As mentioned in the foregoing, the hair-cutting system 1 comprises a hair detector 30. In the present embodiment of the hair-cutting system 1, in which the cutter arrangement 20 comprises more than one functional cutter unit 21, the hair detector 30 is configured and arranged to detect the presence of a hair 11 in respective detector areas 31 near or in the respective functional cutter units 21, which respective detector areas 31 may correspond with the respective areas of the guard element 22 where hairs 11 can actually be cut. In particular, the hair detector 30 is arranged to come into mechanical contact with a hair 11 when the cutter arrangement 20 is moved over the skin 10. To that end, the hair detector 30 comprises hair-contacting portions 32, one per functional cutter unit 21, which are arranged on the guard element 22. Each of the hair-contacting portions 32 is made from a mechanically deformable material that is also electrically conductive in the present embodiment of the hair-cutting system 1. A practical example of material that is suitable in this respect is an electrically conductive, mechanically deformable conformal polymer such as a polymer known as Velostat or Linqstat.

Figure 5:
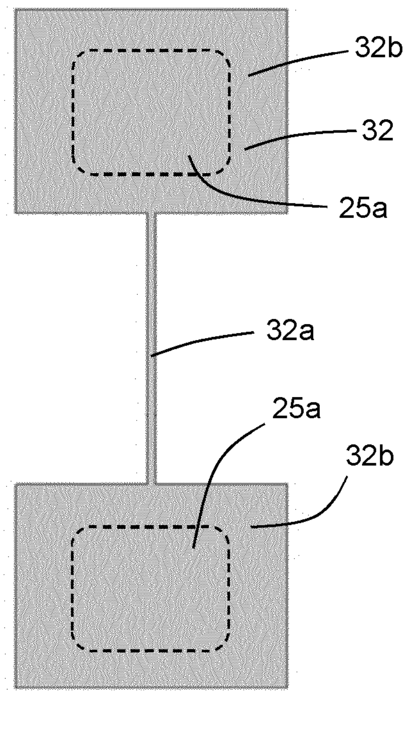

One of the hair-contacting portions 32 is shown in FIG. 5. It can be seen that the hair-contacting portion 32 comprises an elongate strip 32*a* having a thickness and width which are small relative to a length of the strip 32*a*. A practical range of the thickness is a range of 0.1 mm to 0.5 mm, and a practical value of the width is about 0.3 mm. Further, it can be seen that the elongate strip 32*a* has enlarged end portions 32*b*. Both of the enlarged end portions 32*b* of the elongate strip 32*a* are integrally formed with an electric contact pad 35*a*.

Figure 6:
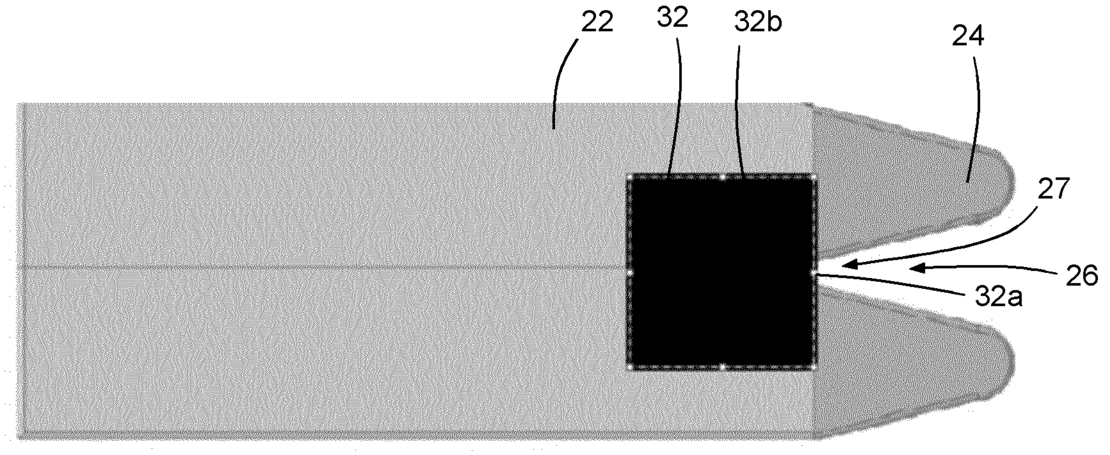
FIGS. 6 and 7 illustrate how the hair-contacting portion can be mounted on the guard element, FIG. 8 diagrammatically shows a front view of the guard element and respective hair-contacting portions arranged on the guard element.
Figure 7:
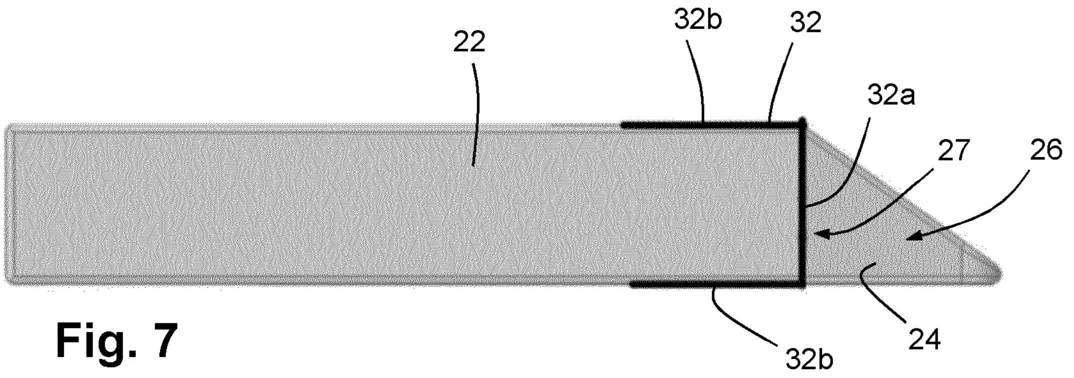
Figure 8:
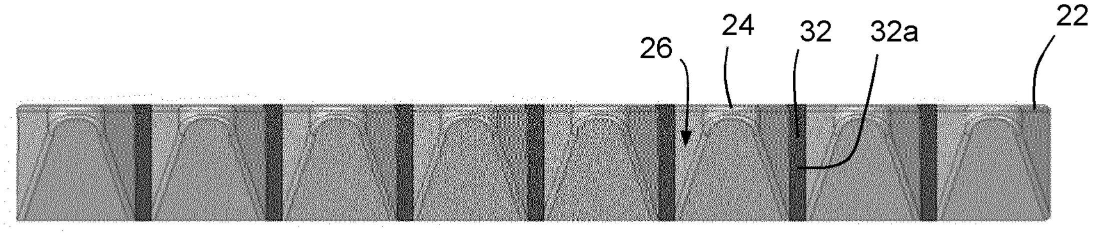

FIGS. 6 and 7 illustrate how a hair-contacting portion 32 is arranged on the guard element 22, namely so as to extend at the position of the narrowest location 27 of the respective hair-catching space 26 and such that the elongate strip 32*a* can be mechanically deformed, particularly mechanically compressed, by a hair 11 in its thickness direction. The hair-contacting portion 32 is wrapped between two hair-cutting teeth 24 of the guard element 22 and when a hair 11 is trapped between the teeth, it will press on the elongate strip 32*a*, thereby causing a change in electric resistance that can be measured. The geometry of the hair-contacting portion 32 is such that the width of the elongate strip 32*a* is approximately on the same dimension as a hair 11, wherein there is no larger surface area that might be contacted by excess skin 10 and create a false signal. Additionally, the tooth geometry protects the elongate strip 30*a* from incidental contact. FIG. 8 shows a front view of the guard element 22 and the respective hair-contacting portions 32 arranged on the guard element 22 between the hair-cutting teeth 24 of the guard element 22.

The hair detector 30 further comprises a measuring system 33 configured to measure a degree of mechanical deformation of each one of the hair-contacting portions 32, and a detector output unit 34 configured to process the measurement results obtained by the measuring system 33. In particular, the detector output unit 34 is functional to determine the presence of a hair 11 in contact with a hair-contacting portion 32 based on the measured degree of the mechanical deformation of the hair-contacting portion 32, and also to generate a detector output $d_{out}$ representative of whether or not a hair 11 is present in at least one of the detection areas 31. In the present embodiment of the hair-cutting system 1, the measuring system 33 comprises an electric circuit 35 configured to measure a change of the electric resistance or electric conductivity of the respective hair-contacting portions 32 resulting from mechanical deformation of the hair-contacting portions 32, wherein the hair-contacting portions 32 are electrically connected to the electric circuit through the electric contact pads 35*a* at their enlarged end portions 32*b*. The detector output unit 34 is configured to determine the presence of a hair 11 in contact with a hair-contacting portion 32 based on the measured change of the electric resistance or electric conductivity of the hair-contacting portion 32.

Figure 9:
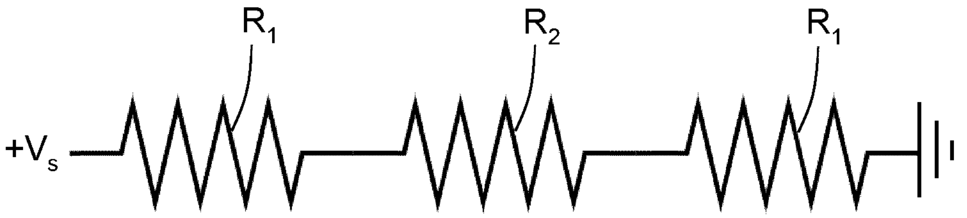
FIG. 9 is a representation of the hair-contacting portion as an electric scheme.
Figure 10:
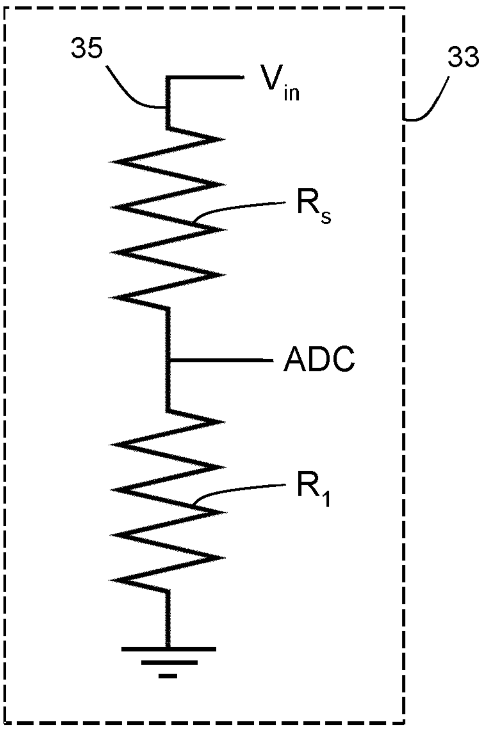
FIG. 10 shows an electric scheme of an electric circuit that is included in the hair detector, and FIG. 11 diagrammatically shows an assembly of components of a hair-cutting system according to a second embodiment of the invention.

With reference to FIGS. 9 and 10, it is now explained how the detector output $d_{out}$ can be determined. FIG. 9 is a representation of the hair-contacting portion 32 as an electric scheme, and FIG. 10 shows an electric scheme of the electric circuit 35 of the measuring system 33. In general, the sheet resistance of a material is given by the following equation:

$$R = \rho\frac{L}{A}$$

where ρ is the electric conductivity, L is the length, and A is the cross-sectional area. The hair-contacting portion 32 can be modeled as the arrangement of resistors $R_1$-$R_2$-$R_1$ in series shown in FIG. 9. The following equations are applicable:

$$\begin{aligned} R_s &= 2R_1 + R_2 \\ &= \frac{2\rho L_1}{w_1 t} + \frac{\rho L_2}{w_2 t} \\ &= \frac{\rho}{t}\left[\frac{2L_1}{w_1} + \frac{L_2}{w_2}\right] \end{aligned}$$

where w is the width, and t is the time duration of the measurement. The signal is optimized by optimizing the derivative $$\frac{\partial}{\partial F}R_s = \frac{\partial}{\partial F}(2R_1 + R_2)$$

where F is the force exerted by a hair 11 pressing on the hair-contacting portion 32. Since the force F is only on the middle resistor $R_2$, the derivate of the first term will be zero.

$$\frac{\partial}{\partial F}R_s = \frac{\partial}{\partial F}R_2 = \frac{\rho L_2}{w_2}\frac{\partial}{\partial F}\left(\frac{1}{t}\right)$$

Thus, it can be seen that the derivate is a function of the electric conductivity ρ, a geometrical constant $L_2/w_2$, and a term related to the rate of change of thickness under force (compressibility). Maximizing the derivative can be done by engineering the geometrical constant, namely by making the elongate strip 32*a* long and narrow in order to obtain a value of the geometrical constant that is as large as practically possible.

The change in electric resistance can be measured in various ways by means of various electric circuits. Practical examples of such electric circuits are a voltage divider, a Wheatstone bridge and a differential amplifier, to mention just a few of the various possibilities. In the present embodiment of the hair-cutting system 1, the electric circuit 35 is a voltage divider, as illustrated in FIG. 10. Assuming that an analog-to-digital converter (ADC) is used, the change in electric resistance is measured as a change in voltage:

$$V_{ADC} = \frac{R_1}{R_1 + R_s}V_{in}$$

The detector output unit 34 generates the detector output $d_{out}$ by comparing the voltage to a reference threshold value. The processor 40 is configured to receive the detector output $d_{out}$ from the detector output unit 34 and to control operation of the hair-cutting system 1 in relation to the detector output $d_{out}$, i.e. to whether or not a hair 11 is found to be present in at least one of the hair-catching space 26 of the guard element 22. The invention covers a practical option according to which at least the detector output unit 34 and the processor 40 are combined in a device that is capable of receiving, processing and generating signals, wherein the device is configured to realize both the functionality of the detector output unit 34 and the functionality of the processor 40.

Advantageously, the processor 40 is configured to only control the cutter element 23 to perform the reciprocating movement in the sideward direction S when this is useful, which is the case when a hair 11 is found to be present in at least one of the hair-catching space 26 of the guard element 22, indeed. If the detector output $d_{out}$ does not indicate the presence of a hair 11, the cutter element 23 is not moved. In this way, it is achieved that the extent of skin irritation is minimized, because the cutter element 23 is only moved when there is an actual need for a cutting action.

It is noted that the invention also covers a possibility according to which the cutter arrangement 20 comprises a number of individually movable cutter elements instead of a single combined cutter element 23 as shown, wherein the respective cutter elements are distributed over the respective pairs of hair-cutting teeth 24 of the guard element 22. In that case, it is possible to realize a way of controlling operation of the cutter arrangement 20 that involves moving each of the cutter elements only when a hair 11 is found to be present in or near the functional cutter unit 21 of which the cutter element is part, independently of the other cutter elements.

Figure 11:
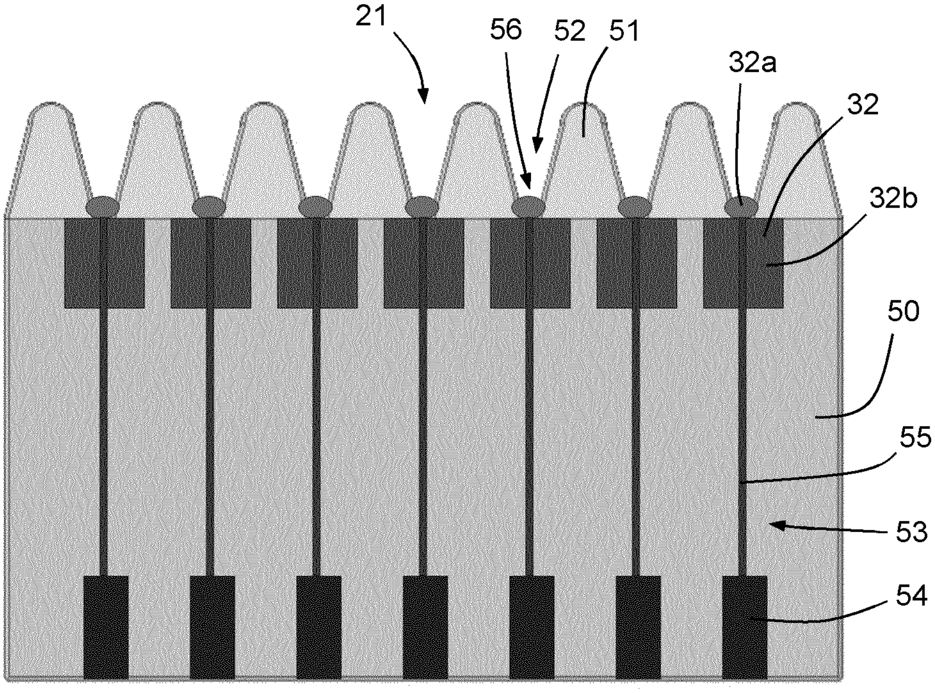

Another possibility that involves individual control of respective functional cutter units 21 is now explained with reference to FIG. 11. FIG. 11 shows an assembly of components of a hair-cutting system 2 according to an alternative embodiment of the invention. In this embodiment, the cutter arrangement 20 is not configured to cut hairs 11 on the basis of relative movement of components. Instead, the cutter arrangement 20 is configured to cut hairs 11 by emitting laser light to the hairs 11.

It can be seen in FIG. 11 that the cutter arrangement 20 of the hair-cutting system 2 comprises a comb-like element 50, and that the comb-like element 50 comprises a row of teeth 51 defining hair-catching spaces 52 between them. Further, it is illustrated that the cutter arrangement 20 comprises a number of laser emitters 53, one per pair of adjacent teeth 51 of the comb-like element 50. Each of the laser emitters 53 comprises a laser diode 54 as a laser source, and an optical fiber 55 that extends from the laser diode 54 to the position of a narrowest location 56 of the respective hair-catching space 52 so as to be capable of emitting laser light from that location 56 and thereby making a cut through a hair 11 as may be present in the hair-catching space 52. The respective combinations of a pair of adjacent teeth 51 and a laser emitter 53 make up respective functional cutter units 21 of the cutter arrangement 20.

The way in which the hair detector 30 is configured is similar to what has been described earlier. There is one hair-contacting portion 32 per functional cutter unit 21, wherein in each of the each functional cutter units 21, the hair-contacting portion 32 is wrapped between the teeth 51 at the position of the narrowest location 56 of the hair-catching space 52, such that the elongate strip 32*a* of the hair-contacting portion 32 can be mechanically deformed by a hair 11 in its thickness direction.

In the case of the alternative embodiment of the hair-cutting system 2 as shown, the processor 40 is configured to determine an on/off status per laser emitter 53 in dependence on the detector output dout received from the detector output unit 34 during operation and to control the respective laser emitters 53 accordingly. In that way, unnecessary emission of laser light is avoided, as such emission is only realized when there is actually a hair 11 to be cut.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word “comprising” does not exclude other steps or elements, and the indefinite article “a” or “an” does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

Notable aspects of the invention are summarized as follows. In a hair-cutting system 1, 2 that comprises a cutter arrangement 20 configured to be moved over skin 10 and comprising at least one functional cutter unit 21 configured to perform a cutting action on hairs 11 protruding from the skin 10, a hair detector 30 is used for the purpose of detecting the presence of a hair 11 in a detection area 31 near or in the at least one functional cutter unit 21. The hair detector 30 comprises at least one hair-contacting portion 32 made from a mechanically deformable material and is configured to provide detector output dout representative of whether or not a hair 11 is detected in the detection area 31. In this way, a method of controlling operation of the hair-cutting system 1, 2 in relation to hair detection is enabled. Among other things, this may imply that in case the cutter arrangement 20 comprises one or more movable hair-cutting components, those hair-cutting components are only actuated when a hair 11 is found to be in their reach, and that in case the cutter arrangement 20 is configured to cut off hairs 11 by exposing them to laser light, the laser light is only emitted when there is actually a hair 11 at a position for receiving the laser light.

The invention claimed is:

1. Hair-cutting system comprising:

a cutter arrangement configured to be moved over skin and comprising at least one functional cutter unit configured to perform a cutting action on hairs protruding from the skin; and a hair detector configured and arranged to detect the presence of a hair in a detection area near or in the at least one functional cutter unit, wherein the hair detector:

is arranged to come into mechanical contact with a hair when the cutter arrangement is moved over the skin;

comprises at least one hair-contacting portion made from a mechanically deformable material;

comprises a measuring system configured to measure a degree of mechanical deformation of the hair-contacting portion; and comprises a detector output unit configured to determine the presence of a hair in contact with the hair-contacting portion based on the measured degree of the mechanical deformation of the hair-contacting portion, and to generate a detector output representative of whether or not a hair is detected in the detection area;

wherein the hair-cutting system further comprises:

a processor configured to receive the detector output from the detector output unit and to determine at least one operation parameter of the hair-cutting system in dependence on the detector output.

2. Hair-cutting system according to claim 1, wherein the hair-contacting portion is made from a mechanically deformable and electrically conductive material, wherein the measuring system comprises an electric circuit configured to measure a change of the electric resistance or electric conductivity of the hair-contacting portion resulting from mechanical deformation of the hair-contacting portion, and wherein the detector output unit is configured to determine the presence of a hair in contact with the hair-contacting portion based on the measured change of the electric resistance or electric conductivity of the hair-contacting portion.

3. Hair-cutting system according to claim 2, wherein the hair-contacting portion is made from an electrically conductive, mechanically deformable conformal polymer.

4. Hair-cutting system according to claim 1, wherein the at least one functional cutter unit has a hair-cutting area in which the functional cutter unit is configured to cut the hair, and wherein the detection area corresponds with the hair-cutting area.

5. Hair-cutting system according to claim 1, wherein the hair-contacting portion comprises an elongate strip having a thickness and width which are small relative to a length of the strip, and wherein the strip is arranged to be mechanically deformed by the hair in its thickness direction.

6. Hair-cutting system according to claim 5, wherein both end portions of the elongate strip are integrally formed with an electric contact pad for electric connection of the strip to the electric circuit.

7. Hair-cutting system according to claim 1, wherein the cutter arrangement comprises a plurality of functional cutter units.

8. Hair-cutting system according to claim 7, wherein each of the functional cutter units is configured for actuation independently of the other functional cutter units.

9. Hair-cutting system according to claim 7, wherein the hair detector comprises, for each respective one of the functional cutter units, a hair-contacting portion configured and arranged to detect the presence of a hair in the detection area near or in said respective one of the functional cutter units.

10. Hair-cutting system according to claim 1, wherein the cutter arrangement comprises at least one movable component, and wherein the processor is configured to determine a control parameter for movement of the movable component in dependence on the detector output.

11. Hair-cutting system according to claim 1, wherein the functional cutter unit comprises a pair of stationary hair-cutting teeth and at least one movable hair-cutting member, wherein a hair-catching space is present between the teeth of the pair of stationary hair-cutting teeth, and wherein the hair-contacting portion of the hair detector is arranged in the hair-catching space.

12. Hair-cutting system according to claim 11, wherein the hair-contacting portion is arranged at a narrowest location of the hair-catching space where base portions of the two teeth of the pair of stationary hair-cutting teeth are connected to each other.

13. Hair-cutting system according to claim 11, wherein the cutter arrangement comprises a plurality of functional cutter units each having a pair of stationary hair-cutting teeth in which a hair-catching space is present, and wherein the hair detector comprises a plurality of hair-contacting portions which are each arranged in a respective one of the hair-catching spaces of the plurality of functional cutter units.

14. Hair-cutting system according to claim 1, wherein the functional cutter unit comprises at least one laser emitter, and wherein the processor is configured to determine an on/off status of the at least one laser emitter in dependence on the detector output.

15. Hair-cutting appliance comprising a functional head supported on a body, wherein a hair-cutting system according to claim 1 is incorporated in the hair-cutting appliance, and wherein the cutter arrangement of the hair-cutting system is located in the functional head of the hair-cutting appliance.

* * * * *